March 25, 1930. E. SCHMIERER 1,751,605

HEATING ELEMENT ARRANGEMENT FOR MIXER BOWLS

Filed May 14, 1928

INVENTOR
EUGENE SCHMIERER
BY
George B. Willcox
ATTORNEY

Patented Mar. 25, 1930

1,751,605

UNITED STATES PATENT OFFICE

EUGENE SCHMIERER, OF SAGINAW, MICHIGAN, ASSIGNOR TO BAKER PERKINS COMPANY, INC., OF SAGINAW, MICHIGAN, A CORPORATION OF NEW YORK

HEATING-ELEMENT ARRANGEMENT FOR MIXER BOWLS

Application filed May 14, 1928. Serial No. 277,725.

This invention relates to mixing machines in which the mixing bowl is of part-cylindrical form and is lined with electrically heated units arranged around the inner periphery of the bowl and bolted thereto.

Heretofore it has been customary to make these units of cast iron in the form of long bars, their outer faces being convex outwardly to fit the concave face of the bowl and the inner faces being concave inwardly to conform with the path of travel of revolving beaters of the type commonly used in mixing machines of this class.

Heretofore the longitudinal side edges of the individual units have been made by facing off the edges in planes that are inwardly convergent so as to include in them the axis of the cylindrical bowl. Thus the walls of the longitudinal edges were radial. In this arrangement the heating units were interlocked by means of these radial edges, consequently no single unit could be taken out for repair or for the purpose of replacement by another unit without removing nearly all of the heating units of the bowl, entailing delay and expense.

My present invention has for its object to facilitate such removal and replacement, to provide a strong, rigid working face made up of heating units capable of being readily removed and replaced without disturbing adjacent units, and wherein if certain of the units become worn on their working faces they can be set out by means of shims and reused.

Another object is to so construct the individual heating units that if they become broken in use the pieces will remain fastened to the wall of the bowl.

With the foregoing and certain other objects in view, which will appear later in the specification, my invention comprises the devices described and claimed and the equivalents thereof.

In the drawings Fig. 1 is a cross section through part of a mixing bowl to which my improvement is applied.

In order that the prime features of novelty and utility involved in the invention may be fully understood I will set forth in some detail the difficulties that have heretofore been encountered in the use of heating elements according to the old mode, and then point out the features wherein my present invention is believed to possess patentable novelty.

The heating elements commonly used in mixing bowls, as well as those employed in my improvement, are long cast iron bars in which electrical resistance wires are imbedded.

In the normal use of mixing machines lined with these heating elements it has been found that they are likely to burn out and require to be replaced at any time, since their life, depending as it does upon electric current and the relative resistance of the imbedded wires, is uncertain. Moreover, the working faces of the units may wear unevenly because one part of the mixing bowl may be subjected to greater wear than other parts. In that case the worn units require adjustment. Breakage of the heating units frequently occurs as a consequence of warping by changes of temperature. If a break occurs through the bolt holes the pieces are apt to come loose from the bolts and get into the material in the mixing chamber. From any of the above causes one or more units may have to be taken out and replaced by new ones.

In cases where wear on the working face is not too great and the unit has not been burned out or broken it may require to be taken out and backed by shims to bring its working face into proper operating position. Whether replacement by a new unit, or adjustment of a worn unit is required, the present invention includes means for replacing it with a minimum of labor and expense.

Figure 1:
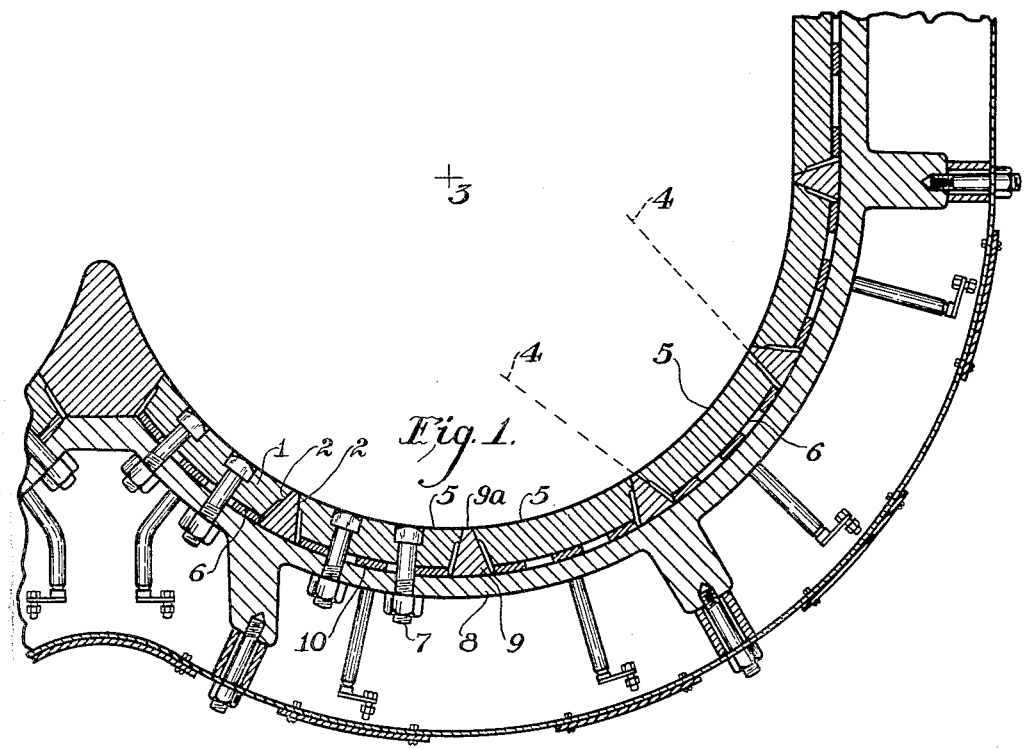
Figure 2:
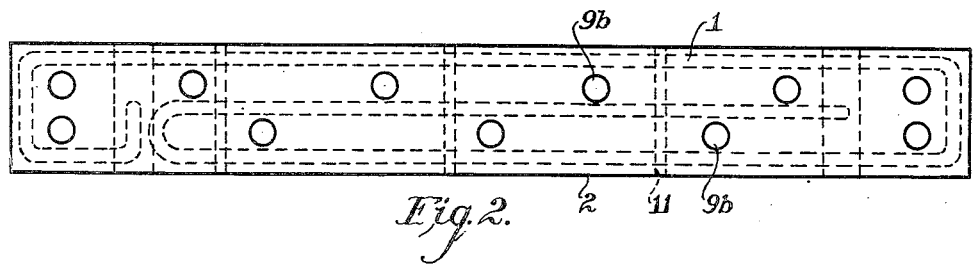
Fig. 2 is a top plan view of a heating unit.
Figure 3:
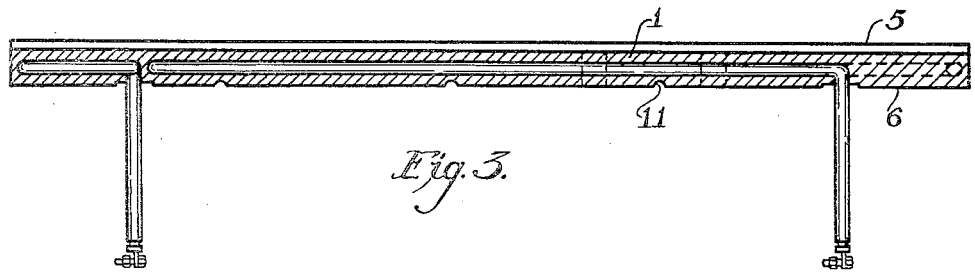
Fig. 3 is a central longitudinal section of the parts shown in Fig. 2.

In a specific embodiment of the invention, as shown in the drawings, I have provided a novel means for mounting the units on the interior faces of the bowl. This means consists in forming each unit 1 with the faces 2 of its longitudinal edges in planes that conceivably may be parallel with each other, but preferably are divergent, as shown by the dotted lines 4—4 in Fig. 1, the inner or working face 5 of the unit being wider than the outer or back face 6. This arrangement permits the unit to be removed by merely unfastening its bolts 7 from the shell 8 of the bowl and lifting it away from the shell radially inward toward the axis 3 of the bowl. The necessary number of heating elements thus shaped are disposed in the bowl so as to constitute a bowl lining capable of being heated in the usual way, but with their adjacent edges 2 spaced apart slightly at their working faces 5 and farther apart at their back edges 6, thus providing between them a channel of substantially V-shaped or wedge-shaped cross section extending from end to end of the bowl.

In this V-shaped space is placed a bar 9 of metal of corresponding cross sectional shape constituting a filler, the narrow edge 9ª of which, together with the faces 5 of heating units 1, presents a continuous working face.

The individual units 1 are secured to the curved wall 8 of the bowl by means of bolts 7 in the usual way, and the spacer bars 9 are held in place by the wedging action of the complemental beveled edge walls 2, 2° of the heating elements.

With the foregoing arrangement any one or all of the heating units 1 can be removed after taking out its fastening bolts. The unit can with equal facility be replaced without disturbing the neighboring units.

The heating element is backed up by adjusting and aligning shims 10 of metal, made in the form of strips of suitable thickness. These strips are clamped against the bowl wall 8 by the heating element when it is bolted in place.

If the heating unit breaks and the fracture takes place through the bolt holes 9ᵇ so as to loosen a piece of the body of the heating element the loose piece might get into the mixer and cause damage, but if the break occurs elsewhere than through the bolt holes the bolts will still hold the broken pieces in place. I therefore provide each of the individual heating units with one or more transverse grooves 11 formed in its outer convex face 6, the grooves being located between bolts. The groove 11 weakens the body of the unit somewhat, not enough to unduly reduce its strength under normal conditions of use, yet enough to cause it to fracture along the groove instead of across the bolt holes if it should become subjected to excessive strains caused either by impact of material against it, or by warping action induced by temperature changes. The possibility of loose pieces getting into the bowl is thus minimized and it is safe to continue the use of the machine until such time as the needed repair or replacement of the broken heating element can be done conveniently.

Having thus described my invention, what I claim and desire to secure by Letters Patent is:

1. In an upwardly concave mixing bowl, heating units whose longitudinal edge walls are disposed in planes so located that a longitudinal space is defined between adjacent units, spacer bars received between said adjacent edge walls so as to be engaged and retained in place by said units, shims between the back faces of the units and the inner face of the bowl, and bolts releasably fastening said units to said bowl wall, for the purposes set forth.

2. In an upwardly concave mixing bowl, heating units whose longitudinal edge walls are disposed so that the working face of the unit is wider than its outer back face, spacer bars received in the space between said adjacent edge walls and held in place thereby, removable backing shims for said units and means for releasably fastening said units to said bowl.

3. In a mixing bowl, heating units whose longitudinal edge walls are disposed so that the working face of the unit is wider than its outer back face, spacer bars received in the space between said adjacent edge walls and held in place thereby, fastening bolts received in holes formed through said units, and grooves formed in the outer convex face of said units between said bolt holes for the purposes set forth.

4. In a mixing bowl, heating units whose longitudinal edge walls are disposed in divergent planes, spacer bars of substantially V-shaped cross section received between adjacent edge walls and held in place thereby, fastening bolts received in holes formed through said units and a weakened seam formed in the outer faces of said units between said bolt holes, for the purposes set forth.

In testimony whereof, I affix my signature.

EUGENE SCHMIERER.